United States Patent [19]

Toyoshima et al.

[11] Patent Number: 5,288,520
[45] Date of Patent: Feb. 22, 1994

[54] PROCESS FOR PAINTING A POLYOLEFINIC RESIN COMPONENT

[75] Inventors: Kazuaki Toyoshima; Takumi Kunikiyo; Mitsutoshi Shimizu, all of Hamamatsu; Shousaku Yamamoto, Yokohama; Yoshifumi Ohama; Yasuyuki Takeuchi, both of Nishinomiya, all of Japan

[73] Assignee: Suzuki Motor Corporation, Shizuoka, Japan

[21] Appl. No.: 765,187

[22] Filed: Sep. 25, 1991

[30] Foreign Application Priority Data

Sep. 25, 1990 [JP] Japan .................. 2-251852

[51] Int. Cl.$^5$ .............................................. B05D 7/02
[52] U.S. Cl. .................................. 427/322; 427/393.5
[58] Field of Search ................... 427/412.3, 393.5, 322

[56] References Cited

U.S. PATENT DOCUMENTS

| | | | |
|---|---|---|---|
| 3,023,126 | 2/1962 | Underwood et al. | 427/412.3 |
| 4,024,317 | 3/1977 | Stoye et al. | 427/322 |
| 4,197,129 | 4/1980 | Muroi et al. | 427/412.3 |
| 4,246,319 | 1/1981 | Jacobone | 427/412.3 |
| 4,529,632 | 7/1985 | Fujii et al. | 427/412.3 |
| 4,692,352 | 9/1987 | Mayumi et al. | 427/393.5 |
| 4,735,995 | 4/1988 | Chettiath | 525/301.5 |
| 4,808,255 | 2/1989 | Markevka et al. | 525/127 |
| 5,051,474 | 9/1991 | Warren et al. | 525/131 |
| 5,068,281 | 11/1991 | Okumura et al. | 427/386 |

*Primary Examiner*—Shrive Beck
*Assistant Examiner*—Diana Dudash
*Attorney, Agent, or Firm*—Antonelli, Terry, Stout & Kraus

[57] ABSTRACT

The present invention provides a process for painting a polyolefinic resin component comprising washing the surface of the polyolefinic resin component, directly coating at least one time the surface with the following paint, and forming topcoat on the surface, the paint being a mixture of a main component containing principally a polymer resin having a hydroxyl number of 20-150, which is obtained by polymerizing (A) Chlorinated polyolefin, (B) Acrylic monomer and (C) Polyester prepolymer and a curing agent of (D) polyfunctional isocyanate compound.

1 Claim, No Drawings

PROCESS FOR PAINTING A POLYOLEFINIC RESIN COMPONENT

BACKGROUND OF THE INVENTION

The present invention relates to a process for painting polyolefinic resin components.

Hitherto, metal was used in addition to glass for trim parts of automobiles. Recently, resin components were often used for bumpers, door mirror covers, moule, spoilers and the like. As such resin components, polyolefinic resin is often used because it has better cost performance than that of urethane resin.

The painting of the surface of these polyolefinic resin components has many restrictions different from the painting of metal. Namely, 1. since the polyolefinic resin has a small polarity and paints or painting films are difficult to adhere on the surface, only a specified paint can be used. Further, 2. upon heating and drying, the temperature should he below 120° C. In spite of these restrictions, upon painting and coating, the same ability of adherence, visual appearance, weather resistance, chemical resistance, solvent resistance and the like is required as that of the surface of automobiles.

To improve the adherence of paints on the surface of polyolefinic resin components, the surface is pretreated by flame treatment, corona discharge, plasma treatment, chrome sulfate treatment or the like, and then the surface is paintea with a facing material. However, these methods do not always give sufficient adherence because of the complex form.

As a different method, the surface of polyolefinic resin components is washed with a solvent such as trichloroethane, the surface is painted with an exclusive primer having good adherence, and a facing material is used. However, there are problems that many steps are used in this method. Since the primer is expensive, the total cost increases.

To improve the technique, resin or paints having good adherence to the surface of polyolefinic resin are disclosed as follows.

a. In Japanese Patent Laid-Open Publication Number 57-200438, a mixture of chlorinated polyolefinic resin and acrylic resin.

b. In Japanese Patent Laid-Open Publication Numbers 59-27968 and 62-149734, a resin combining a copolymer of a chlorinated polyolefinic resin and an acrylic monomer with an isocyanate compound.

c. In Japanese Patent Laid-open Publication Number 62-18434, a resin combining a copolymer of a chlorinated polyolefinic resin, an acrylic monomer and a chlorinated polydiene with an isocyanate compound.

Problems that the Invention is to Solve

However, resin mixture a. should contain 35% or less of chlorine. The resin solution easily separates into two phases. When the resin is used for paints, there are problems that the dispersion stability, the coating gloss, the coating adherence, the solvent resistance, the weather resistance and physical properties are insufficient.

In resin b., the stability of the resin solution is better in comparison with resin mixture a.. On the other hand, the coating gloss and the weather resistance are insufficient.

In resin c., since the solvent resistance and the weather resistance are also insufficient, the resin is not put to practical use.

The above resin mixture a., resin b and resin c are limited to use for domestic electric apparatus, interior parts of automobiles and the like which do not require strict weather resistance. These resins can not realize single paint finish of trim parts of automobiles such as bumpers.

In the automobile industry, development of paints able to be applied directly to the surface of the automobile, without a primer, is desired.

SUMMARY OF THE INVENTION

The present invention has done to meet the demand of the above industry, and it aims to provide a process for painting polyolefinic resin components and to provide excellent coating ability of adherence, visual appearance, weather resistance, chemical resistance, solvent resistance and the like which are obtained by painting at a time or several times directly on the surface of polyolefinic resin.

The present invention provides a process for painting a polyolefinic resin component comprising washing the surface of the polyolefinic resin component, directly coating at least one time the surface with the following paint and forming topcoat on the surface; the paint being a mixture of a main component containing principally a polymer resin having a hydroxyl number of 20 to 150, which is obtained by polymerizing the following ingredients (A), (B) and (C), and a curing agent of the following ingredient (D).

(A) Chlorinated polyolefin, 5-50% by weight.

(B) Acrylic monomer having hydroxy groups or a mixture of the above acrylic monomer and an ethylene monomer copolymerizable with the above acrylic monomer, 5-80% by weight.

(C) Polyester prepolymer having ethylene terminal double bonds and a number-average molecular weight of 500-3000, 1-50% by weight.

(D) Polyfunctional isocyanate compound having NCO groups per hydoxyl groups of the polymer resin of NCO/OH =0.4-2.0.

In the process for painting of the present invention, as described in detail in the following, two-component type paint comprising a main paint component containing principally a polymer resin obtained by polymerization of ingredients (A), (B) and (C) (abbreviated as resin (E) hereinafter) and a paint curing agent containing principally ingredient (D) is used.

As ingredient (A) which is used in the main component, chlorinated polymer which is synthesized from at least one of ethylene, propylene and butadiene, and well-known chlorinated polyolefinic resin which is obtained by introducing carboxyl groups into a polymer which is synthesized from at least one of ethylene, propylene and butadiene to obtain a denatured polymer and chlorinating the denatured polymer can be used. The chlorinated polyolefins having chlorine content of 10-50% by weight, preferably 15-40% by weight, and number-average molecular weight of 3000-100000, preferably 5000-50000 can be used.

When the chlorine content is less than 10% by weight, the solvent stability is particularly poor at a low temperature, and the affinity for an acrylic resin ingredient is weak and the visual appearance of coating is bad after polymerization. When the chlorine content is more than 50% by weight, the adherence and the weather resistance are disagreeable.

On the other hand, when the number-average molecular weight is less than 3000, the solvent resistance, the hardness and the adherence are poor. When the number-average molecular weight is more than 100000, since the viscosity of the resin solution increases, much diluted solvent is required. The paint solid content becomes low, and it is difficult to obtain sufficient coating thickness. As a result, the coating work efficiency undesirably becomes bad.

As ingredient (B), namely acrylic monomers having hydroxyl groups, 2-hydroxyethyl (meth)acrylate, 2-hydroxypropyl (meth) acrylate, 3-hydroxypropyl (meth)acrylate, 2-hydroxybutyl (meth)acrylate, 3-hydroxybutyl (meth)acrylate, 4-hydroxybutyl (meth)acrylate can be exemplified. Besides, addition products of these compounds and E-caprolactam, a Placcel FM monomer or a Placcel FA monomer (manufactured by DAICEL CHEMICAL INDUSTRIES, LTD.) can be used.

Further, as the other vinyl monomers which are able to copolymerize and to use with the acrylic monomers having hydroxyl groups, for example, methyl (meth)acrylate, ethyl (meth)acrylate, propyl (meth)acrylate, butyl (meth)acrylate, 2-ethylhexyl (meth)acrylate, lauryl (methfi)acrylate, cyclohexyl (meth)acrylate, glycidyl (meth)acrylate, (meth)acrylic acid, styrene, p-tert-butylstyrene, vinyltoluene, vinyl acetate and acyl radical-modified (meth)acrylate can be used.

Ingredient (C), namely polyester compounds having ethylenic terminal unsaturated bonds remarkably improve the pigment dispersion and the visual appearance of coating for the resin obtained by polymerization of ingredients (A) and (b).

Ingredient (C) is a compound obtained by esterifying a polybasic acid and a polyhydroxy alcohol to synthesize a polyester having terminal hydroxyl groups and then reacting the polyester with an ethylenic unsaturated monomer having 0.2–0.5 equivalent of isocyanate groups per equivalent of hydroxyl groups of the polyester or reacting the polyester with an acid anhydride having double bonds represented by maleic anhydride. The number-average molecular weight of ingredient (C) is 500 to 3000, preferably 700 to 2000. When the number-average molecular weight is less than 500, the good visual appearance of coating can not he expected. When the number-average molecular weight is more 3000, the solvent resistance of coating is lowered and there is a fear of gelation in the reaction process for polymerizing resin (E).

As the polybasic acid used in ingredient (C), one or more polybasic acid suchas phthalic anhydride, isophthalic acid, tetrahydrophthalic anhydride, hexahydrophthalic anhydride, trimellitic anhydride, pyromellitic anhydride, tetrachlorophthalic anhydride, terephthalic acid, adipic acid, azelaic acid, sebacic acid, succinic acid, 1,4-cyclohexanedicarboxylic acid which are commonly employed in the preparation of polyesters, or one or more esters of these polybasic acid can be used.

As the polyhydroxy alcohol used in ingredient (C), dihydric alcohols such as ethylene glycol, propylene glycol, diethylene glycol, tripropylene glycol, butanediol, pentanediol, hexanediol, neopentyl glycol, hexylene glycol, an ethylene oxide addition product of bisphenol A, an propylene oxide addition product of bisphenol A, an ethylene oxide addition product of hydrogenated bisphenol A and a propylene oxide addition product of hydrogenated bisphenol A, glycerine, trimethyrolethane, trimethyrolpropane, hexanetriol, pentaerythritol, 1,4-cyclohexyl dimethanol and the like can be used alone or by mixing.

As the ethylenic unsaturated monomer having isocyanate groups used in ingredient (C), methacryloyl isocyanate, 2-isocyanatoethyl methacrylate and m-iso propenyl-$\alpha,\alpha$-dimethylbenzyl isocyanate are preferably exemplified without any limitation.

In the paint composition used in the present invention, resin (E) which is principally contained in the main component is obtained by polymerization of ingredient (A) of 5 to 50% by weight, preferably 10 to 40% by weight, ingredient (B) of 5 to 80% by weight, preferably 20 to 70% by weight and ingredient (C) of 1 to 50% by weight, preferably 10 to 40% by weight, and the hydroxyl number is 20 to 150. When the amount of ingredient (A) is less than 5% by weight, the adherence of paints is bad. When the amount of ingredient (A) is more than 25% by weight, the solvent resistance and the weather resistance of paints are lowered. When the amount of ingredient (B) is less than 5% by weight, the solvent resistance, weather resistance and water resistance of paints are bad. When the amount of ingredient (B) is more than 80% by weight, the coating of paints undesirably becomes too hard. When the amount of ingredient (C) is less than 1% by weight, the dispersion properties and visual appearance of paints are lowered. When the amount of ingredient (C) is more than 50% by weight, the solvent resistance of paints is undesirably lowered. When the hydroxyl number is less than 20, since the resin is insufficiently cross-linked, the solvent resistance, weather resistance and chemical resistance of the coating of paints are lowered. When the hydroxyl number is more than 150, the glossiness of paints is lowered, so that the visual appearance of products becomes bad.

As ingredient (D) used in the curing agent of the paint composition used in the present invention, namely as a polyfunctional isocyanate compound, tolylene diisocyanate, diphenylmethane diisocyanate, isophorone diisocyanate (IPDI), hexamethylene diisocyanate (HDI), trimethylhexane diisocyanate, methylcyclohexane diisocyanate, methylene-bis(cyclohexyl isocyanate), di(isocyanatomethyl)cyclohexane, addition compounds of these diisocyanates with ethylene glycol, polyethylene glycol, polypropylene glycol, polyether polyol, polycaprolactone polyol, trimethylolethane, trimethylolpropane, hexanetriol, pentaerythritol or water, and multimeric diisocyanates can be exemplified.

The mixing ratio of the main component and the curing agent is 0.4 to 2.0 equivalent, preferably 0.6 to 1.5 equivalent of isocyanate groups of ingredient (D) to 1 equivalent of hydroxyl groups of resin (E). When the ratio is less than 0.4 equivalent, the coating properties and solvent resistance of paints are lowered. When the ratio is more than 2.0 equivalent, it is economically disadvantageous because the properties are not particularly improved.

In the paint composition used in the present invention, in addition to the above essential ingredients, coloring pigments, extender pigments, aluminum powder, pearl mica powder, the other resins, solvents, additives, etc can he used.

Particularly unlimited coloring pigments are, inorganic pigments such as titanium dioxide, carbon black, ferric oxide and lead chromate, and organic pigments such as phthalocyanine blue, phthalocyanine green and quinacridone red.

The coloring pigments are kaolin, barium sulfate, calcium carbonate and the like.

The organic solvents can be used as solvents for dissolving the resin ingredients. To be concrete, aromatic hydrocarbons such as toluol, xylol and solvent naphtha; esters such as methyl acetate, ethyl acetate, butyl acetate and methoxylethyl acetate; and ketones such as acetone, methyl ethyl ketone and methyl isobutyl ketone can be used. These solvents can be used alone or by mixing two or more solvents.

As the additives, additives which are commonly used in paints, such as surface-active agents, surface treating agents and pigment anti-settling agents can be used. Moreover, curing accelerator such as zinc naphthenate, zinc octoate and dibutyltin laurate can simultaneously used.

The paint composition used in the present invention is a binary coating compound as described above. In painting, the mixture of the main component and the curing agent is provided. An example of a process for preparing the mixture is as follows.

The main component is prepared by mixing ingredient (E), a pigment, a solvent and an additive, and dispersing the mixture by using a sand mill or the like.

The curing agent is prepared by using the polyfunctional isocyanate compound of ingredient (D) as it is or by dissolving the compound in an ester solvent.

The paint composition used in the present invention can directly coat on the surface of polyolefin resin. The coating method is as follows.

Firstly, the coating surface of polyolefin resin is washed with an appropriate solvent at room temperature or by heating for prearrangement. At the same time, the surface is preferably washed with trichloroethane vapor to slightly swell or etch the surface.

Then, the main component and the curing agent are mixed in a fixed ratio, the mixture is diluted with thinner to obtain a viscosity of 12 to 20 seconds (20° C.) determined by Ford cup NO.4, and the obtained paint is coated on the surface. The coating method is not limited particularly, but spray is preferred to obtain good coating appearances. The surface is coated one or more times to obtain a coating thickness of 20 to 50 μm on drying. 10 minutes after setting, the surface is dried by heating at 70° to 120° C. for 15 to 40 minutes. At this time, it can be dried at 1 to 3 coats and 1 to 2 bakes. Otherwise, it is dried at room temperature for 6 hours. However, in consideration of dust adherence and coating efficiency, heat dry is preferred.

In case of metallic finish, a clear paint is commonly coated by wet on wet on the metallic base paint treated with the paint composition used in the present invention. The clear paint is not limited in particular, but in consideration of the excellent adherence to the paint coating and the other paint properties, acrylic two-pack urethane is preferred.

In case of pearl tone finish, a color base paint treated with the paint composition used in the present invention is coated on the surface, then the surface is coated with a pearl base paint containing mica powder and with a clear paint, and the surface is dried at 3c1b (3 coats and 1 bake) or 3c2b. The kinds of pearl base paint and the clear paint used in the above process are not particularly limited. Preferably, acrylic two-pack urethane is used for the same reason as the above metallic finish.

According to the present invention, the surface of car trim parts such as a bumper which is formed from polyolefinic resin materials is directly coated without conventional special treatment or primer coating. There are merits such as paint efficiency, paint control and cost reduction. As a result, coating which is excellent in adherence, visual appearance, weather resistance, chemical resistance, solvent resistance, etc. can be formed.

DESCRIPTION OF PREFERRED EMBODIMENTS

The following examples illustrate the present invention more specifically. In these examples, "part" shows part by weight and "%" shows % by weight.

MANUFACTURING EXAMPLE 1

Preparation of Ingredient (C)

In a flask equipped with a stirrer, a fractionating column, a water separator, a cooler and a thermometer, 520 parts of hexahydrophthalic anhydride and 480 parts of neopentyl glycol were charged. The mixture was heated with stirring. While removing the condensed water from the reaction system at 160° C. to 230° C., the temperature was raised for 4 hours at a certain heating rate. After the temperature was raised to 230° C., the system was evacuated and the reaction was continued in the maintenance of the same temperature. When the acid value became less than 5, the reaction was stopped. After the system was cooled to 80° C., 205 parts of isocyanatoethyl methacrylate was charged in the flask. An addition reaction was continued with stirring at 80° C. for 1 hour, and polyester prepolymer $C_1$ having ethylenic terminal double bonds was obtained. The number-average molecular weight of the obtained resin was 860 and the hydroxyl number was 65.

MANUFACTURING EXAMPLE 2

Using the same reactor as used in Manufacturing example 1, the polymerization reaction was conducted under the same conditions as in Example 1 except that 560 parts of hexahydrophthalic anhydride, 440 parts of neopentyl glycol and 105 parts of isocyanatoethyl methacrylate were combined to obtain polyester prepolymer $C_2$. The number-average molecular weight of the obtained resin was 1540 and the hydroxyl number was 37.

MANUFACTURING EXAMPLES 3-9

Preparation of Resin (E)

In a flask equipped with a stirrer, a cooler and a thermometer, toluene and, ingredients (C) and (A) were charged in each of the amounts indicated in Table 1. The mixture was heated with stirring to 100° C. to obtain a homogeneous solution. Then, a mixture solution of ingredient (B) and benzoyl peroxide was added dropwise for 2 hours. The mixture was further stirred at the same temperature for 1 hour. After the system was cooled to 80° C., azoisobutyronitrile was added, the mixture was stirred for 5 hours. In each Manufacturing example, resin (E) solutions $E_1$–$E_7$ were obtained. The solid content % of the resin solutions and the ingredients (A)/(B)/(C)% and the hydroxyl numbers of the resins are shown in Table 1.

EXAMPLES 1-4 AND COMPARATIVE EXAMPLES 1-4

Preparation of a white enamel main component and a curing agent

A resin (E) solution, titanium dioxide, MODAFLOW, xylene and butyl acetate were mixed in each of the amounts indicated in Table 2. The mixture was charged in an attritor, and the mixture was dispersed for 4 hours to prepare the white enamel main component.

As the curing agent, DURANATE THA-100 (trade name, manufactured by Asahi Kasei Kogyo CO., Ltd.) of ingredient (D) was used.

Application to Resin Molding

A car bumper which was molded from polyolefin resin (trade name SNB-4, manufactured by Mitsui Toatsu Kagaku Co., Ltd.) was degreased with 1,1,1-trichloroethane vapor (74° C.) for 60 seconds and air-dried.

The white enamel main component and the curing agent prepared in the above were mixed in a fixed ratio. After the mixture was diluted with a thinner of xylene/butyl acetate =60/40 by weight to obtain a value of 16 seconds (20° C.) determined by Ford cup NO.4, the bumper was coated with the mixture by using an air spray to obtain a dried coating thickness of 40 μm. After the coating was allowed to stand for 10 minutes in a room, the coating was heated and dried at 30° C. for 30 minutes. After 24 hours, the coating properties were tested. The test method was as follows. The results are shown in Table 3. Test Method of the coating properties

Visual appearance of finishing

The coating surface having good glossy finish, not much of roughness, and no coating defects such as cracks, flow and patches is accepted.

Adhesion properties

Using a test of checker cellophane tape of Japanese Industrial Standard JIS-K-5400 (1979) 6.15, the front, the side, the upper surface and the lower surface of the coating products were tested. When the coating was not stript off, the adhesion is accepted.

Gasoline resistance

One part of the coating product was immersed in regular gasoline (manufactured by Nippon Sekiyu Co., Ltd., trade name: Nisseki Silver gasoline) at 20° C. for 30 minutes. After the product was taken out from the gasoline, the immersed part was observed and the adhesion of the coating was tested. When the coating surface conditions were not changed, the gasoline resistance of the coating was accepted. To test the adhesion of the coating, the above checker cellophane tape test was conducted. The results were shown by the remains of perfect checkers per 100 checkers. 100/100 was accepted.

Acid resistance 0.2 ml of 0.1N sulfuric acid was dropped on the coating surface. After leaving as it is for 24 hours at 20° C. and 75% RH (relative humidity), the surface was washed with water, the coating conditions were observed. When the surface was not changed, the acid resistance was accepted.

Alkali resistance 0.2 ml of 0.1N sodium hydroxide solution was dropped on the coating surface. After leaving as it is for 24 hours at 20° C. and 75% RH, the surface was washed with water, the coating conditions were observed. When the surface was not changed, the alkali resistance was accepted.

Humidity resistance

After the coating product was left as it is at 50° C. and 98% RH in a thermo-hygrostat, the coating surface was observed and the adhesion test was conducted. When the coating conditions were not changed, the humidity resistance was accepted. To test the adhesion of the coating, the above checker cellophane tape test was conducted. The results were shown by the remains of perfect checkers per 100 checkers. 100/100 was accepted.

Weather resistance

Test pieces of 70mm×150mm cut from the coating product was tested by an accelerated weathering test with a sunshine weather meter (manufactured by Suga Shikenki Co., Ltd.). After 1000 hours, a retain ratio (%) ((gloss value after test / initial gloss value)×100) of 60 degree specular gloss (JIS-K-5400 (1979) 6.7) was determined and an adhesion test was conducted. When the coating has a gloss retain ratio of 80% or more and the color change was not observed, the weather resistance was accepted. To test the adhesion of the coating, the above checker cellophane tape test was conducted. The results were shown by the remains of perfect checkers per 100 checkers. 100/100 was accepted.

REFERENTIAL EXAMPLE 1

Using the same degreased bumper as used in Example 1, the bumper was coated with chlorinated polypropylene resin primer (manufactured by Nippon Oil & Fats Co., Ltd., trade name: PLYMAC No.1500 primer) as a primer for conventional polyolefin resin only by using an air spray coating method to obtain a dried coating thickness of 10 to 15 lim. After flushing off the solvent for one minute, polyester two-pack urethane (manufactured by Nippon Oil & Fats Co., Ltd., trade name: PLYMAC No.4000 white) as a facing material for the humper was applied on the surface by wet-on-wet coating to obtain a dried coating thickness of 35-40 μm. After setting for 10 minutes at room temperature, the coating surface was stoved and dried for 30 minutes at 80° C. to test the adhesion properties of the coating by using the same method as described in Example 1. The results are shown in Table 3.

EXAMPLES 5-8 AND COMPARATIVE EXAMPLES 5-8

Preparation of a main component of metallic base coating and a curing agent

A resin (E) solution, aluminum paste, MODAFLOW, xylene and butyl acetate were mixed in each of the amounts indicated in Table 4. The mixture was homogenized with a dispersion mixer for 10 minutes and the main component of metallic base coating was prepared.

As the curing agent, DURANATE THA-100 of ingredient (D) was used.

Application to a resin molding

Using the same bumper as used in Example 1, it was degreased and dried under the same conditions as in Example 1. The main component of metallic base coating and the curing agent prepared in the above were mixed in a fixed ratio. After the mixture was diluted with a thinner of toluene/ethyl acetate =70/30 (ratio by weight) to obtain a value of 13 seconds (20° C.) determined by Ford cup No.4, the bumper was coated with the mixture solution by using an air splay to obtain a dried coating thickness of 20 $\mu$m. After flashing off the solvent for one minute, acrylic two-pack urethane (manufactured by Nippon Oil & Fats Co., Ltd., trade name: PLYMAC No.8000 clear) as a clear coating was applied on the bumper surface by wet-on-wet coating to obtain a dried coating thickness of 30 $\mu$m. After leaving at room temperature for 10 minutes, the coating surface was heated and dried at 80° C. for 30 minutes. After 24 hours, the adhesion properties of the coating were tested by using the same method as described in Example 1. The results are shown in Table 5.

REFERENTIAL EXAMPLE 2

Using the same degreased bumper as used in Example 1, the bumper was coated with the same exclusive primer as used in Referential example 1. After flushing off the solvent for one minute, acrylic two-pack urethane (manufactured by Nippon Oil & Fats Co., Ltd., trade name: Primack No.8000 metallic silver) as a facing metallic base coating was applied on the bumper surface by wet-on-wet coating to obtain a dried coating thickness of 15 to 20 $\mu$m by an air spray method. After flushing off the solvent for one minute, acrylic two-pack urethane as a facing material for the bumper was applied on the surface by wet-on-wet coating to obtain a dried coating thickness of 25 to 30 $\mu$m. After setting at room temperature for 10 minutes, the coating surface was stoved and dried at 80° C. for 30 minutes. The adhesion properties of the coating were tested by using the same method as described in Example 1. The results are shown in Table 5.

EXAMPLES 9–12 AND COMPARATIVE EXAMPLES 9–12

Preparation of a Main Component of White Color Base Coating and a Curing Agent A resin (E) solution, titanium oxide, MODAFLOW, xylene and butyl acetate were mixed in each of the amounts indicated in Table 6. The mixture was charged in an attritor and dispersed for 4 hours to prepare the main component of white color base coating.

As the curing agent, DURANATE THA-100 of ingredient (D) was used.

Application to a resin molding

Using the same bumper as used in Example 1, it was degreased and dried under the same condition as in Example 1. The white color base coating and the curing agent prepared in the above were mixed in a fixed ratio. After the mixture was diluted with a thinner of toluene-/ethyl acetate =70/30 (ratio by weight) to obtain a value of 13 seconds (20° C.) determined by Ford cup No.4, the bumper was coated with the mixture solution by using an air spray to obtain a dried coating thickness of 30 $\mu$m. After flashing off the solvent for one minute, the bumper was coated with acrylic two-pack urethane (manufactured by Nippon Oil & Fats Co., Ltd., trade name: Primack No.8000 pearl base white (pearl mica powder (trade name of Merck Company: IRIODIN 103 W II) containing 5% by weight)) as a pearl base coating by using an air spray coating method to obtain a dried coating thickness of 30 $\mu$m. After flushing off the solvent for one minute, acrylic two-pack urethane (manufactured by Nippon Oil & Fats Co., Ltd., trade name: PLYMAC No.8000 clear) as a clear coating was applied on the bumper surface by wet-on-wet coating by using an air spray to obtain a dried coating thickness of 20 $\mu$m. Then, after leaving at room temperature for 10 minutes, the coating surface was heated and dried at 80° C. for 30 minutes. After 24 hours, the adhesion properties of the coating were tested by using the same method as described in Example 1. The results are shown in Table 7.

REFERENTIAL EXAMPLE 3

Using the same degreased bumper as used in Example 1, the bumper was coated with the same exclusive primer as in Referential example 1. After flushing off the solvent for one minute, polyester two-pack urethane (manufactured by Nippon Oil & Fats Co., Ltd., trade name: PLYMAC No.4000 white base) as a color base coating for pearl coating was applied on the bumper surface by wet-on-wet coating by using an air spray coating method to obtain a dried coating thickness of 30 $\mu$m. After setting at room temperature for 10 minutes, the coating surface was stoved and dried at 80° C. for 30 minutes. Then, the same pearl base coating and the same clear coating as described in Example 9 were applied on the surface of the color base coating, and the surface was stoved and dried in the same way as in Example 9. The coating properties were tested. The results are shown in Table 7.

As shown in the results obtained by Examples 1–12, the surface of car trims such as bumpers which are molded from polyolefin resin materials can be coated by the coating method of the present invention. As a result, molding products having excellent facing properties such as adhesion, visual appearance, solvent resistance, chemical resistance and weather resistance can be provided in comparison with the conventional products.

On the other hand, in comparative examples 1, 5 and 9, the gasoline resistance of the coated products is inferior to that of the products in examples because the content of ingredient (C) in resin (E) is 60%.

In comparative examples 2, 6 and 10, the gasoline resistance of the coated products is inferior to that of the products in examples because the hydroxyl number of the resins is 15. In the product of comparative example 2, since the clear coating is not formed on the coating surface, the acid resistance, the alkali resistance and the weather resistance are inferior to those of products in examples.

In comparative examples 3, 7 and 11, since the content of ingredient (A) in the resin is 60%, the gasoline resistance and the weather resistance of the coated products are inferior to those of products in examples. In comparative examples 4, 8 and 12, since the mixed amounts of the curing agent are little, the gasoline resistance and the humidity resistance are inferior to those of the products in examples.

TABLE 1

| Manufacturing example | 3 | 4 | 5 | 6 | 7 | 8 | 9 |
|---|---|---|---|---|---|---|---|
| Resin (E) solution | $E_1$ | $E_2$ | $E_3$ | $E_4$ | $E_5$ | $E_6$ | $E_7$ |
| Toluene | 756 | 522 | 522 | 56 | 756 | 522 | |
| Ingredient (C): | | | | | | | |
| $C_1$ | 400 | 100 | | 300 | 600 | | 100 |
| $C_2$ | | | 100 | | | 100 | |
| Ingredient (A): chlorinated polypropylene | 333 | 667 | 667 | 1333 | 333 | 667 | 2000 |
| Ingredient (B): | | | | | | | |
| cyclohexyl methacrylate | 166 | 217 | 230 | 90 | 100 | 267 | 86 |
| t-butyl methacrylate | 104 | 190 | 200 | 56 | 60 | 234 | 54 |
| lauryl methacrylate | 83 | 54 | 58 | 45 | 49 | 67 | 43 |
| styrene | 62 | 82 | 87 | 34 | 36 | 100 | 32 |
| 2-hydroxyethyl acrylate | | 152 | 120 | | | | 27 |
| 2-hydroxyethyl methacrylate | 80 | | | 70 | 50 | | 80 |
| acrylic acid | 5 | 5 | 5 | 5 | 5 | 5 | 5 |
| Polymerization initiator | | | | | | | |
| benzoyl peroxide | 10 | 10 | 10 | 10 | 10 | 10 | 10 |
| azobisisobutyronitrile | 1 | 1 | 1 | 1 | 1 | 1 | 1 |
| Total | 2000 | 2000 | 2000 | 2000 | 2000 | 2000 | 2411 |
| Solid content in Resin (E) solution (%) | 50 | 50 | 50 | 50 | 50 | 50 | 42 |
| Ingredient (A) (%) | 10 | 20 | 20 | 40 | 10 | 20 | 60 |
| Ingredient (B) (%) | 50 | 70 | 70 | 30 | 30 | 70 | 30 |
| Ingredient (C) (%) | 40 | 10 | 10 | 30 | 60 | 10 | 10 |
| Hydroxyl number of Resin (E) | 60 | 80 | 60 | 50 | 60 | 15 | 40 |

TABLE 2

| | Example | | | | Comparative example | | | |
|---|---|---|---|---|---|---|---|---|
| | 1 | 2 | 3 | 4 | 1 | 2 | 3 | 4 |
| Main components | | | | | | | | |
| Resin (E) solution: (parts) | | | | | | | | |
| $E_1$ | 100 | | | | | | | 100 |
| $E_2$ | | 100 | | | | | | |
| $E_3$ | | | 100 | | | | | |
| $E_4$ | | | | 100 | | | | |
| $E_5$ | | | | | 100 | | | |
| $E_6$ | | | | | | 100 | | |
| $E_7$ | | | | | | | 120 | |
| titanium oxide | 50 | 50 | 50 | 50 | 50 | 50 | 50 | 50 |
| MODAFLOW*1 | 0.3 | 0.3 | 0.3 | 0.3 | 0.3 | 0.3 | 0.3 | 0.3 |
| xylene | 10 | 10 | 10 | 10 | 10 | 10 | | 10 |
| butyl acetate | 10 | 10 | 10 | 10 | 10 | 10 | | 10 |
| Total | 170.3 | 170.3 | 170.3 | 170.3 | 170.3 | 170.3 | 170.3 | 170.3 |
| Curing agent DURANATE THA-100*2 | 10 | 15 | 10 | 10 | 10 | 3 | 7 | 3 |
| NCO/OH equivalent ratio | 0.94 | 1.05 | 0.94 | 1.12 | 0.94 | 1.12 | 0.98 | 0.28 |

*1Surface adjustor manufactured by Monsant Company, trade name
*2Manufactured by Asahi Kasei Kogyo Co., Ltd, isocyanate content: 21%

TABLE 3

| | Example | | | | Comparative example | | | | Referentive example |
|---|---|---|---|---|---|---|---|---|---|
| | 1 | 2 | 3 | 4 | 1 | 2 | 3 | 4 | 1 |
| Finish visual appearance | accepted | accepted | accepted | accepted | accepted | accepted | a little gloss reduction | accepted | accepted |
| Adherence | accepted | accepted | accepted | accepted | accepted | accepted | accepted | accepted | accepted |
| Gasoline resistance | | | | | | | | | |
| coating conditions | accepted | accepted | accepted | accepted | swell | swell | swell | swell | accepted |
| adherence | 100/100 | 100/100 | 100/100 | 100/100 | 98/100 | 100/100 | 100/100 | 90/100 | 100/100 |
| Acid resistance | accepted | accepted | accepted | accepted | accepted | gloss reduction | accepted | gloss reduction | accepted |
| Alkali resistance | accepted | accepted | accepted | accepted | accepted | gloss reduction | accepted | gloss reduction | accepted |
| Humidity resistance | | | | | | | | | |
| coating conditions | accepted | accepted | accepted | accepted | accepted | accepted | accepted | gloss reduction | accepted |
| adherence | 100/100 | 100/100 | 100/100 | 100/100 | 100/100 | 100/100 | 100/100 | 100/100 | 100/100 |
| Weather resistance | | | | | | | | | |
| coating conditions | accepted | accepted | accepted | accepted | accepted | a little chalking | chalking | a little chalking | accepted |
| adherence | 100/100 | 100/100 | 100/100 | 100/100 | 100/100 | 100/100 | 100/100 | 100/100 | 100/100 |

TABLE 4

| | Example | | | | Comparative example | | | |
|---|---|---|---|---|---|---|---|---|
| | 5 | 6 | 7 | 8 | 5 | 6 | 7 | 8 |
| Main components | | | | | | | | |
| Resin (E) solution: | | | | | | | | |

TABLE 4-continued

|  | Example | | | | Comparative example | | | |
| --- | --- | --- | --- | --- | --- | --- | --- | --- |
|  | 5 | 6 | 7 | 8 | 5 | 6 | 7 | 8 |
| (parts) | | | | | | | | |
| $E_1$ | 100 | | | | | | | 100 |
| $E_2$ | | 100 | | | | | | |
| $E_3$ | | | 100 | | | | | |
| $E_4$ | | | | 100 | | | | |
| $E_5$ | | | | | 100 | | | |
| $E_6$ | | | | | | 100 | | |
| $E_7$ | | | | | | | 120 | |
| Aluminum paste | 11 | 11 | 11 | 11 | 11 | 11 | 11 | 11 |
| MODAFLOW*[1] | 0.1 | 0.1 | 0.1 | 0.1 | 0.1 | 0.1 | 0.1 | 0.1 |
| xylene | 30 | 30 | 30 | 30 | 30 | 30 | 20 | 30 |
| butyl acetate | 30 | 30 | 30 | 30 | 30 | 30 | 20 | 30 |
| Total | 171.1 | 171.1 | 171.1 | 171.1 | 171.1 | 171.1 | 171.1 | 171.1 |
| Curing agent DURANATE THA-100*[2] | 10 | 15 | 10 | 10 | 10 | 3 | 7 | 3 |
| NCO/OH equivalent ratio | 0.94 | 1.05 | 0.94 | 1.12 | 0.94 | 1.12 | 0.98 | 0.28 |

*[1] Surface adjustor manufactured by Monsanto Company, trade name
*[2] Manufactured by Asahi Kasei Kogyo Co., Ltd, isocyanate content: 21%

TABLE 5

|  | Example | | | | Comparative example | | | | Referential example |
| --- | --- | --- | --- | --- | --- | --- | --- | --- | --- |
|  | 5 | 6 | 7 | 8 | 5 | 6 | 7 | 8 | 2 |
| Finish visual appearance | accepted | accepted | accepted | accepted | accepted | accepted | accepted | accepted | accepted |
| Adherence | accepted | accepted | accepted | accepted | accepted | accepted | accepted | acepted | accepted |
| Gasoline resistance | | | | | | | | | |
| coating conditions | accepted | accepted | accepted | accepted | swell | swell | swell | swell | accepted |
| adherence | 100/100 | 100/100 | 100/100 | 100/100 | 100/100 | 100/100 | 100/100 | 100/100 | 100/100 |
| Acid resistance | accepted | accepted | accepted | accepted | accepted | accepted | accepted | accepted | accepted |
| Alkali resistance | accepted | accepted | accepted | accepted | accepted | accepted | accepted | accepted | accepted |
| Humidity resistance | | | | | | | | | |
| coating conditions | accepted | accepted | accepted | accepted | accepted | accepted | accepted | blister | accepted |
| adherence | 100/100 | 100/100 | 100/100 | 100/100 | 100/100 | 100/100 | 100/100 | 100/100 | 100/100 |
| Weather resistance*[1] | | | | | | | | | |
| coating conditions | accepted | accepted | accepted | accepted | accepted | accepted | a little color change | gloss reduction | accepted |
| adherence | 100/100 | 100/100 | 100/100 | 100/100 | 100/100 | 100/100 | 0/100*[2] | 100/100 | 100/100 |

*[1] Test time: 3000 hours
*[2] Cleavage between base coating and clear

TABLE 6

|  | Example | | | | Comparative example | | | |
| --- | --- | --- | --- | --- | --- | --- | --- | --- |
|  | 9 | 10 | 11 | 12 | 9 | 10 | 11 | 12 |
| Main components | | | | | | | | |
| Resin (E) solution: (parts) | | | | | | | | |
| $E_1$ | 100 | | | | | | | 100 |
| $E_2$ | | 100 | | | | | | |
| $E_3$ | | | 100 | | | | | |
| $E_4$ | | | | 100 | | | | |
| $E_5$ | | | | | 100 | | | |
| $E_6$ | | | | | | 100 | | |
| $E_7$ | | | | | | | 120 | |
| titanium oxide | 60 | 60 | 60 | 60 | 60 | 60 | 60 | 60 |
| MODAFLOW*[1] | 0.1 | 0.1 | 0.1 | 0.1 | 0.1 | 0.1 | 0.1 | 0.1 |
| xylene | 10 | 10 | 10 | 10 | 10 | 10 | | 10 |
| butyl acetate | 10 | 10 | 10 | 10 | 10 | 10 | | 10 |
| Total | 180.1 | 180.1 | 180.1 | 180.1 | 180.1 | 180.1 | 180.1 | 180.1 |
| Curing agent DURANATE THA-100*[2] | 10 | 15 | 10 | 10 | 10 | 3 | 7 | 3 |
| NCO/OH equivalent ratio | 0.94 | 1.05 | 0.94 | 1.12 | 0.94 | 1.12 | 0.98 | 0.28 |

*[1] surface adjustor manufactured by Monsanto Company, trade name
*[2] manufactured by Asahi Kasei Kogyo Co., Ltd, isocyanate content: 21%

TABLE 7

| | Example | | | | Comparative example | | | | Referential example |
|---|---|---|---|---|---|---|---|---|---|
| | 9 | 10 | 11 | 12 | 9 | 10 | 11 | 12 | 3 |
| Finish visual appearance | accepted | accepted | accepted | accepted | accepted | accepted | accepted | accepted | accepted |
| Adherence | accepted | accepted | accepted | accepted | accepted | accepted | accepted | accepted | accepted |
| Gasoline resistance | | | | | | | | | |
| coating conditions | accepted | accepted | accepted | accepted | swell | swell | swell | swell | accepted |
| adherence | 100/100 | 100/100 | 100/100 | 100/100 | 100/100 | 100/100 | 100/100 | 98/100 | 100/100 |
| Acid resistance | accepted | accepted | accepted | accepted | accepted | accepted | accepted | accepted | accepted |
| Alkali resistance | accepted | accepted | accepted | accepted | accepted | accepted | accepted | accepted | accepted |
| Humidity resistance | | | | | | | | | |
| coating conditions | accepted | accepted | accepted | accepted | accepted | accepted | accepted | blister | accepted |
| adherence | 100/100 | 100/100 | 100/100 | 100/100 | 100/100 | 100/100 | 100/100 | 100/100 | 100/100 |
| Weather resistance[*1] | | | | | | | | | |
| coating conditions | accepted | accepted | accepted | accepted | accepted | accepted | color change | accepted | accepted |
| adherence | 100/100 | 100/100 | 100/100 | 100/100 | 100/100 | 100/100 | 0/100[*2] | 100/100 | 100/100 |

[*1] Test time: 3000 hours
[*2] Cleavage between base coating and clear

We claim:

1. A process for painting a polyolefinic resin component comprising washing a surface of the polyolefinic resin component and directly without using a primer, coating at least one time the surface with a paint composition; the paint composition being obtained by mixing a component containing a polymer resin having a hydroxyl number of 20–150 with a curing agent selected from the group consisting of polyfunctional isocyanate compounds (D) at an equivalent ratio of NCO groups of the curing agent per hydroxyl groups of the polymer resin of NCO/OH=0.4–2.0, and the polymer resin being obtained by polymerizing the following ingredients (A), (B) and (C):

(A) chlorinated polyolefin, 5–50% by weight;
   (B) acrylic monomer having hydroxyl groups or a mixture of the acrylic monomer and an ethylene monomer which is able to copolymerize with the acrylic monomer, 5–80% by weight; and
   (C) polyester prepolymer having ethylene terminal double bonds and a number-average molecular weight of 500–3,000, 1–50% by weight.

* * * * *